United States Patent
Ueno et al.

(10) Patent No.: US 8,698,616 B2
(45) Date of Patent: Apr. 15, 2014

(54) MONITOR CONTROL SYSTEM

(75) Inventors: Yohei Ueno, Tokyo (JP); Tadashi Oi, Tokyo (JP); Kazuyuki Mori, Tokyo (JP); Akira Kobashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 197 days.

(21) Appl. No.: 13/331,031

(22) Filed: Dec. 20, 2011

(65) Prior Publication Data

US 2012/0161957 A1 Jun. 28, 2012

(30) Foreign Application Priority Data

Dec. 28, 2010 (JP) ................................. 2010-291681
Nov. 18, 2011 (JP) ................................. 2011-252171

(51) Int. Cl.
| G08B 23/00 | (2006.01) |
| G08B 29/00 | (2006.01) |
| G05B 19/18 | (2006.01) |
| G01M 1/38 | (2006.01) |
| G06F 15/173 | (2006.01) |
| G09G 5/00 | (2006.01) |

(52) U.S. Cl.
USPC .............. 340/517; 340/506; 700/2; 700/275; 700/277; 709/224; 345/1.1

(58) Field of Classification Search
USPC ........ 340/517, 506; 700/2, 275, 277; 345/1.1; 709/224
See application file for complete search history.

(56) References Cited

U.S. PATENT DOCUMENTS

| 5,247,433 | A | * | 9/1993 | Kitaura et al. | ................... | 700/83 |
| 6,523,038 | B1 | * | 2/2003 | Iida et al. | .............................. | 1/1 |
| 2007/0297557 | A1 | * | 12/2007 | Kuwatani | ....................... | 376/259 |

FOREIGN PATENT DOCUMENTS

| CN | 1749899 | A | | 3/2006 | | |
| JP | 7-129232 | | | 5/1995 | | |
| JP | 11-327636 | | | 11/1999 | | |
| JP | 11327636 | A | * | 11/1999 | ............. | G05B 23/02 |
| JP | 2002-108444 | | | 4/2002 | | |
| JP | 2002108444 | A | * | 4/2002 | ............. | G05B 23/02 |
| JP | 2004-213148 | | | 7/2004 | | |
| JP | 2005-44109 | | | 2/2005 | | |
| JP | 2005044109 | A | * | 2/2005 | ............. | G05B 23/02 |

OTHER PUBLICATIONS

Office Action (with partial English translation) dated Nov. 29, 2013, in corresponding Chinese Appln No. 201110445923.4 (8 pages).

* cited by examiner

*Primary Examiner* — George Bugg
*Assistant Examiner* — Munear Akki
(74) *Attorney, Agent, or Firm* — Oblon, Spivak, McClelland, Maier & Neustadt, L.L.P.

(57) ABSTRACT

A monitor control system includes a focused information database and a report determination part. The focused information database is configured to store focused information that is information associating a focused item focused by each operator with the operator with respect to actual plant information. The report determination part outputs report determination information independently for each operator based on the actual plant information and the focused information. The determination information indicates a measured value, an alert, and a set value that are coincident with the focused items focused by a certain operator and additionally that is determined to need to be reported.

8 Claims, 11 Drawing Sheets

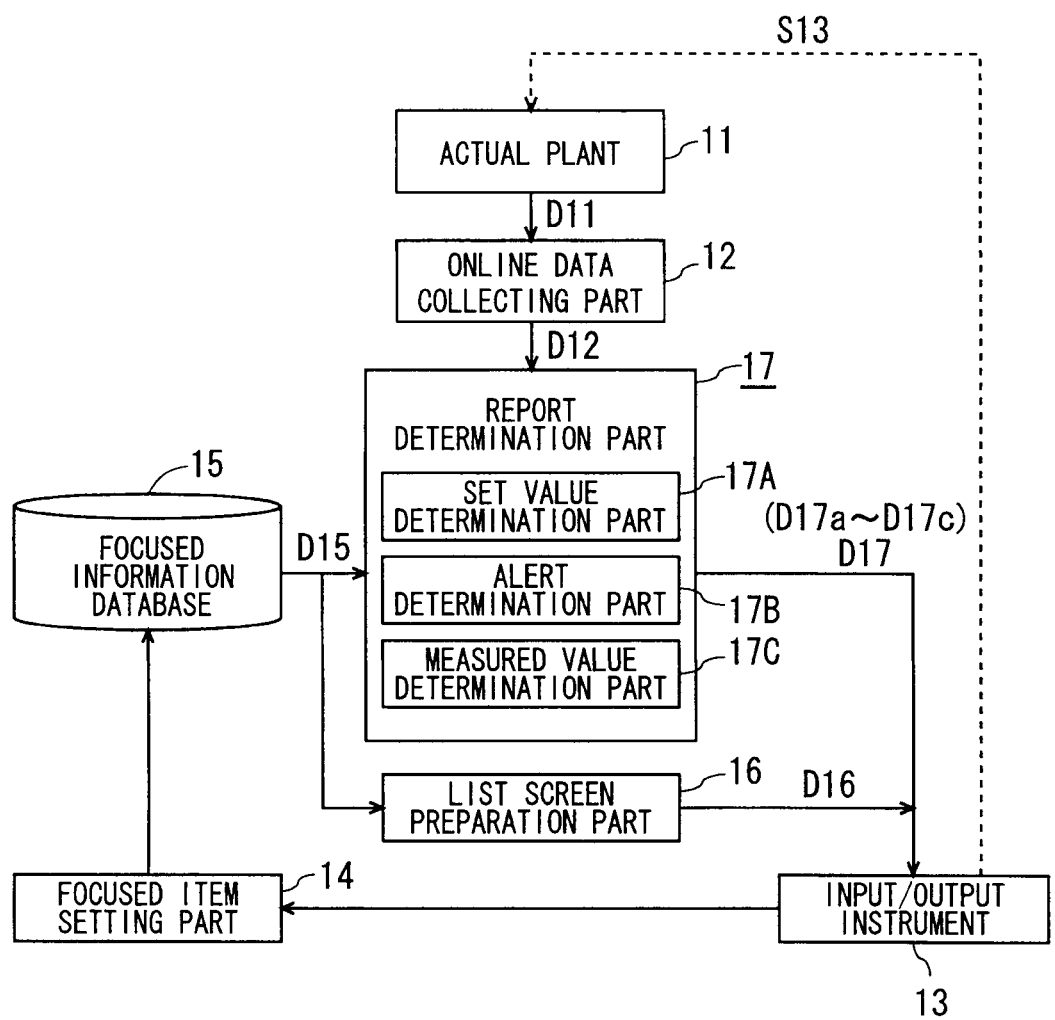
F I G . 1

F I G . 5
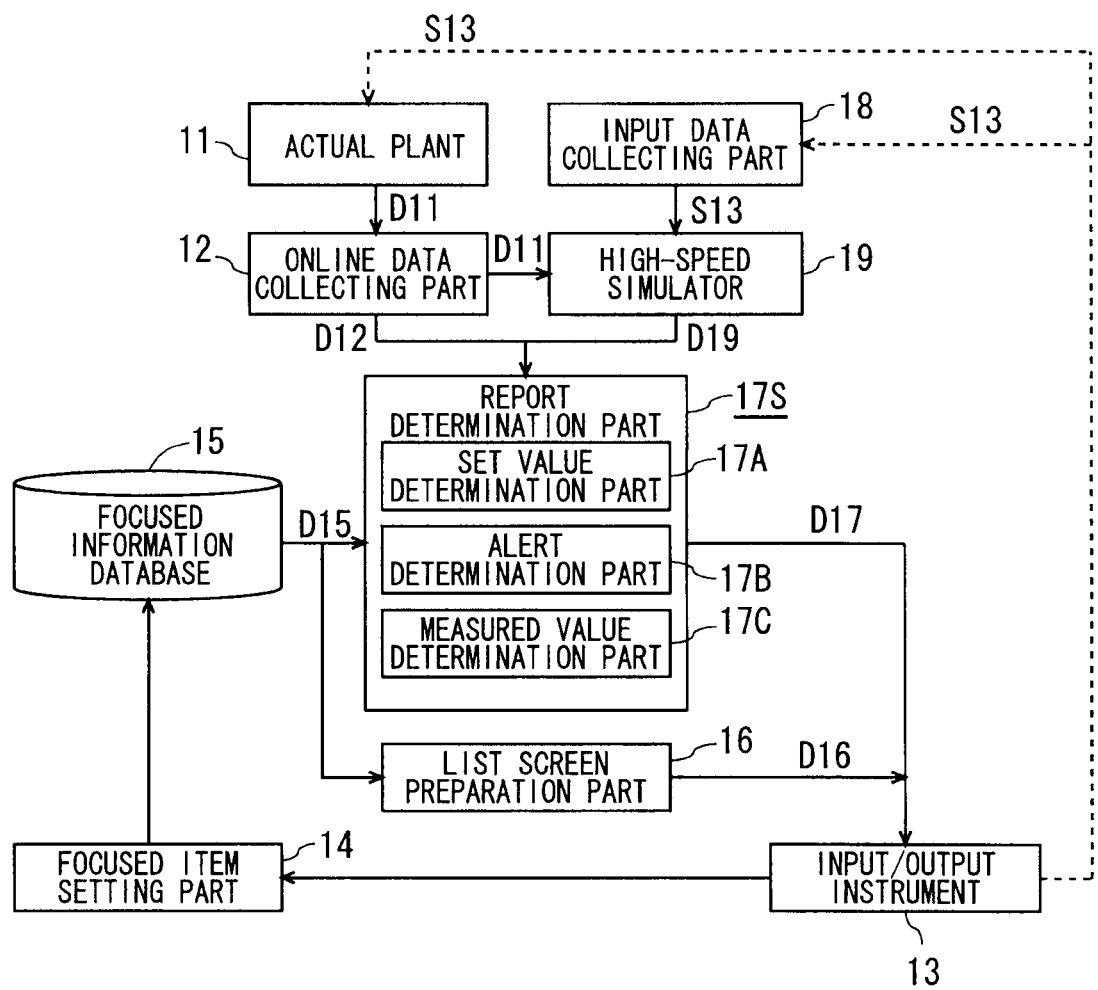

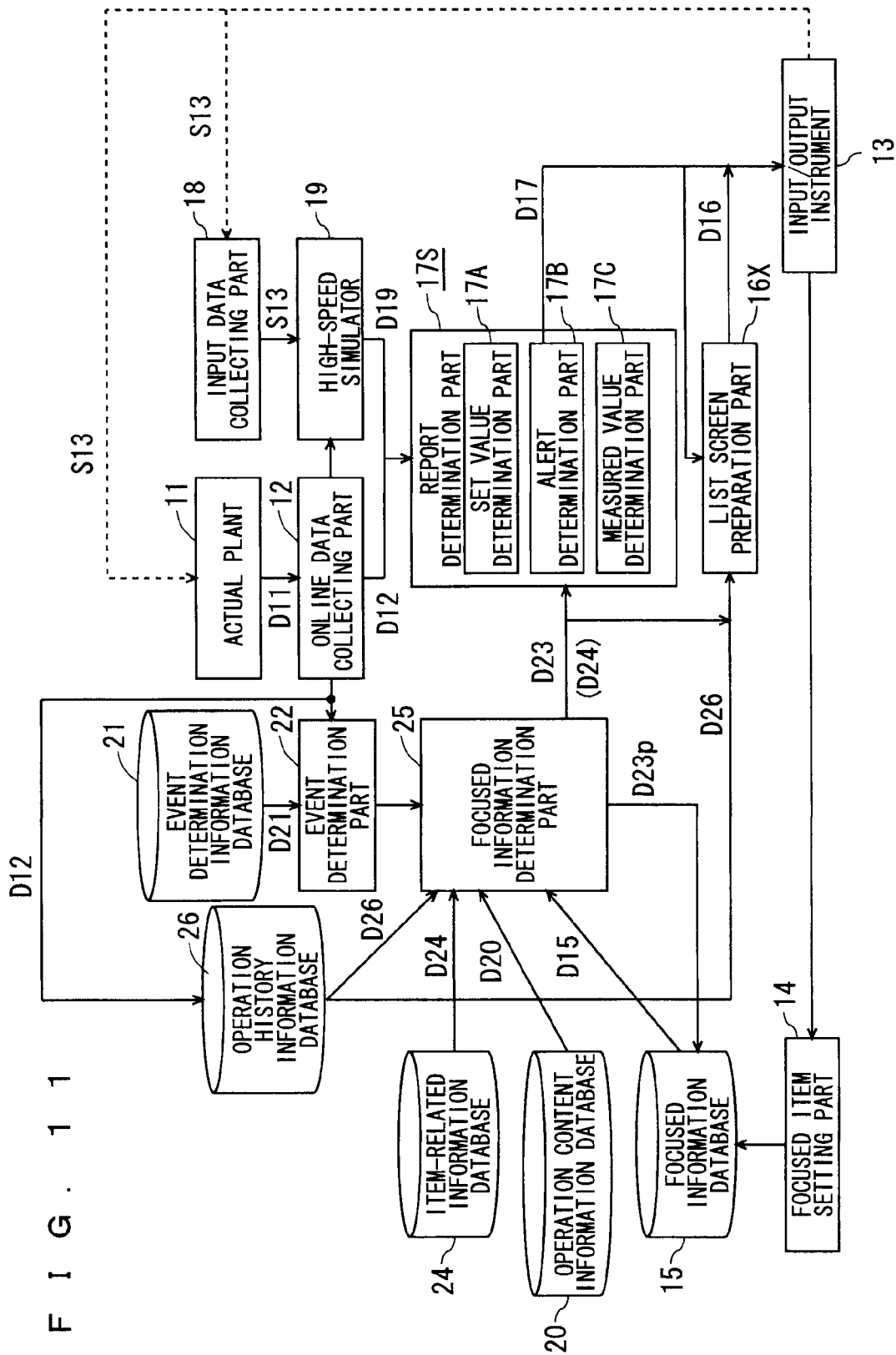

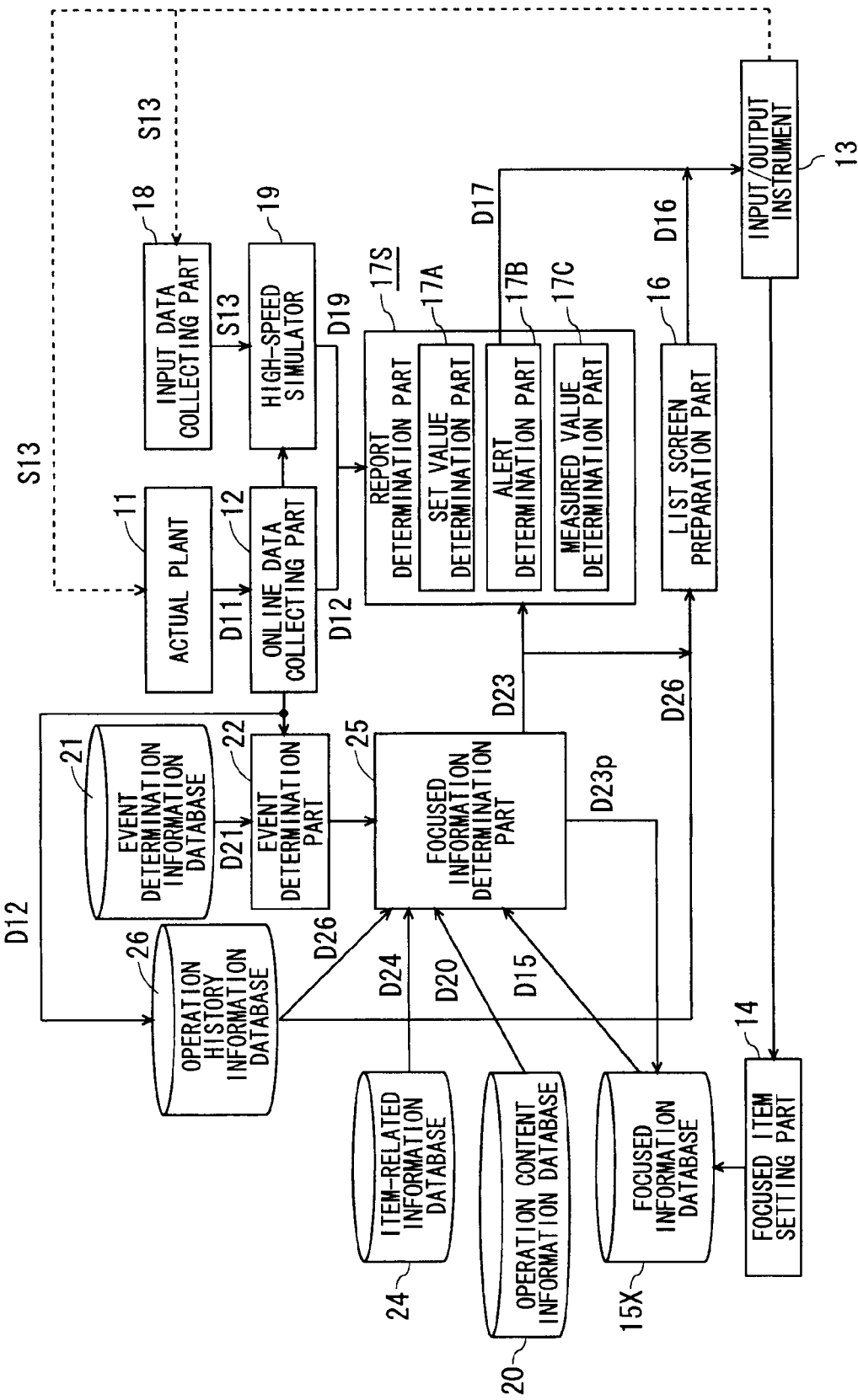

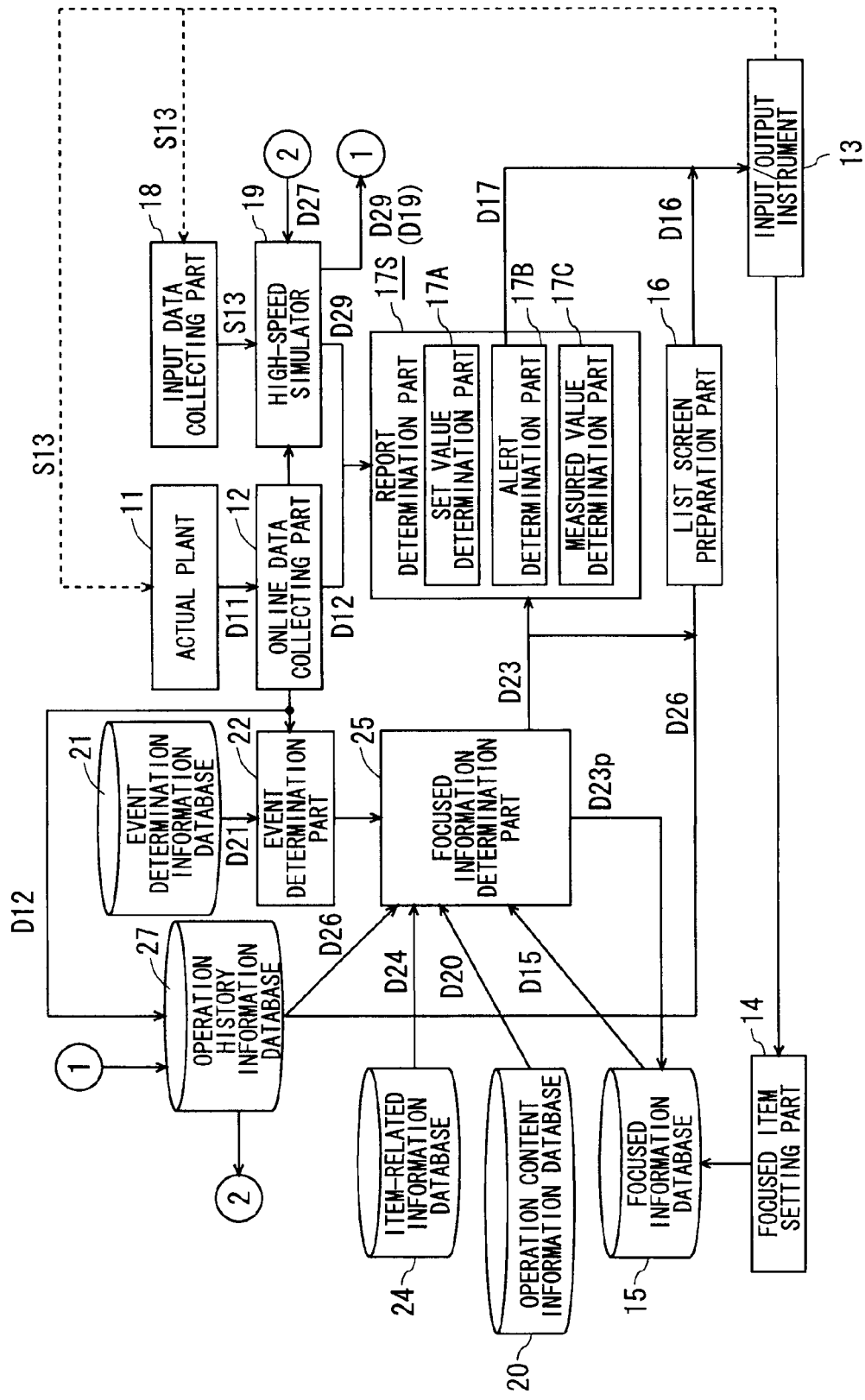

MONITOR CONTROL SYSTEM

BACKGROUND OF THE INVENTION

1. Field of the Invention

The present invention relates to a monitor control system for performing a monitor control on a plant, and particularly to a user interface function thereof.

2. Description of the Background Art

In many large-scale plants, a monitor control method is adopted in which information of sensors that are installed in respective instruments of the plant is collectively monitored by a central monitor control panel.

In recent years, software implementation of the central monitor control panel is advancing. In the software implementation of the central monitor control panel, a display of a plant measured value and a control of instruments are implemented by a graphical user interface, instead of a hardware indicator and a hardware switch that have been conventionally used. This exerts an effect that a monitor control system is downsized and an operation load imposed on an operator can be reduced.

Normally, a plant monitor control operation team is made up of one or more operators and one or more operation supervisors. For each of the operators and the operation supervisors, a special plant monitor control input/output device is prepared, and each of the operators and the operation supervisors uses a monitor control panel assigned thereto to monitor and control the plant.

In a plant monitor control operation in which a complicated control is performed, such as in a case of a large-scale plant, there are often a plurality of operators arranged to share the operation. The operation supervisor determines which part of the operation is to be assigned to each operator based on a current plant state, and gives an instruction about an operation content to each operator. Each operator performs the operation while following the instruction that is orally given from the supervisor.

In some kind of the operation content, the operators may cooperate with each other to perform the operation. At this time, while the operation is being performed, communication is made not only between the supervisor and the operator but also between the operators.

In a monitor control system of a large-scale plant, there is a large number of items to be monitored and controlled, such as measurement points in the plant and control instruments. Thus, there is a tendency that the number of pages of a monitor control screen and the amount of information per page are increased. Workers (the operators and the operation supervisors) have to find and monitor necessary information from a large number of display items in accordance with a plant situation, an operation content, and the like, at that time. However, if desired information is distributed among a plurality of screens, it is necessary to perform the monitor operation while switching the screens. This increases cognitive load on the operator, and additionally may cause the operator to fail to recognize signs of changes in the monitor items that are not displayed.

To solve such a problem, Japanese Patent Application Laid-Open No. 2002-108444 proposes a method in which rules for notifying a guidance by a user are customized. In the method proposed in Japanese Patent Application Laid-Open No. 2002-108444, the user registers notification determination conditions and contents of a notification, and thereby a system ca report a sign of a change prior to generation of an alert.

However, in the system (apparatus) disclosed in Japanese Patent Application Laid-Open No. 2002-108444, the following problems still remain.

Regarding, among display items on a monitor control screen, display items for which the notification rules are not registered in the system, no notification is made even though values of the display items change.

Additionally, in a case where a plurality of operators share an operation, the operators generally look at different items among the display items on the monitor control screen. However, in Japanese Patent Application Laid-Open No. 2002-108444, the notification rules are common to all the operators.

Thus, if the notification is performed in accordance with the notification rules registered in the system, each operator has to make a choice about each of notifications. In a case where the system frequently gives notifications, a load of selecting information increases, which may hinder the monitor control operation that is an originally intended purpose.

Moreover, the communication among the workers involves the following problem. In a large-scale plant, a plurality of operators share an operation to perform the monitor control operation. Because of a layout of a control panel, the operators are generally located spaced apart from one another, and cannot visually check the other operator's operations. Therefore, the operators orally communicate with one another, which however makes it difficult for the operator to accurately comprehends the other operator's operation contents because of miscommunication, absorption in the operations, and the like.

Facilities of the plant operate in cooperation with one another, and one operation may influence various locations in the plant. An operation performed by one operator may influence a monitor item of another operator. Thus, in a case where the operators cannot accurately comprehend each other's operation contents, they may fail to recognize a sign of a change of the monitor item resulting from each other's operation.

SUMMARY OF THE INVENTION

An object of the present invention is to provide a monitor control system having a graphical user interface function that allows an operator to easily recognize a sign of a change of an item focused by the operator.

A monitor control system configured to perform a monitor control on an actual plant with reference to a monitor control screen includes a plant information collecting part, a focused information database, a report determination part, and a predetermined number of monitor control screen output parts.

The plant information collecting part collects a measured value obtained from the actual plant and a set value for controlling the actual plant, and outputs actual plant information including measured value information, alert information, and set value information. The measured value information indicates the measured value. The alert information indicates the necessity of an alert based on the measured value. The set value information indicates the set value.

The focused information database stores focused information that is information associating focused items focused by a predetermined number of operators with the predetermined number of operators with respect to the actual plant information.

The report determination part outputs report determination information independently for each of the predetermined number of operators based on the actual plant information and the focused information. The report determination information indicates at least one of the measured value, the alert, and the set value that is coincident with the focused item focused by a certain operator and additionally that is determined to need to be reported.

The report determination information includes reporting measured value information, reporting alert information, and reporting set information that indicate the measured value, the alert, and the set value determined to need to be reported, respectively.

The report determination part includes a set value determination part, an alert determination part, and a measured value determination part.

The set value determination part determines whether or not the set value focused by a certain person has been changed by a person other than the certain person, and then outputs information associating the focused set value with a result of the determination as the reporting set value information. The determination is made with respect to, among the set values indicated by the set value information included in the actual plant information, the set value existing as the focused item in the focused information.

The alert determination part outputs information associating the alert with the necessity of an alert as the reporting alert information. The association is made with respect to, among the alerts indicated by the alert information included in the actual plant information, the alert existing as the focused item in the focused information.

The measured value determination part determines whether or not there is a tendency to cause a predetermined change and outputs information associating the measured value with a result of the determination as the reporting measured value information. The determination is made with respect to, among the measured values indicated by the measured value information included in the actual plant information, the measured value existing as the focused item in the focused information.

Each of the predetermined number of monitor control screen output parts is provided for each of the predetermined number of operators, and makes an output on the monitor control screen of each operator based on the report determination information.

The monitor control system according to the present invention includes the focused information database and the report determination part. The focused information database stores focused information that is information associating focused items focused by a predetermined number of operators with the predetermined number of operators with respect to the actual plant information. The report determination part outputs report determination information independently for each of the predetermined number of operators based on the actual plant information and the focused information. The report determination information indicates at least one of the measured value, the alert, and the set value that is coincident with the focused item focused by a certain operator and additionally that is determined to need to be reported.

As a result, each of the predetermined number of operators registers his/her desired focused item as the focused information on the focused information database. Thus, each operator can recognize, on the monitor control screen, the report determination information concerning his/her desired focused item. This exerts an effect that the operator can easily check a sign of a change of the focused item.

Moreover, the report determination part includes the set value determination part, the alert determination part, and the measured value determination part. This exerts an effect that the report determination information concerning each of the focused set value, alert, and measured value can be easily recognized on the monitor control screen.

As a result, in the monitor control system according to the invention of the present application, a variation in the measured value occurring until the alert is generated, and a change of the set value made by another person can be reported on the monitor control screen. Therefore, for example, before the alert actually occurs, the operator can preliminarily find occurrence of an alert based on a change of the measured value and can promptly deal with it.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a configuration of a monitor control system according to an embodiment 1 of the present invention;

FIG. 5 is a block diagram showing a configuration of a monitor control system according to an embodiment 2 of the present invention;

FIG. 11 is a block diagram showing a configuration of a monitor control system according to an embodiment 5 of the present invention;

FIG. 12 is a block diagram showing a configuration of a monitor control system according to an embodiment 6 of the present invention; and FIG. 13 is a block diagram showing a configuration of a monitor control system according to an embodiment 7 of the present invention.

DESCRIPTION OF THE PREFERRED EMBODIMENTS

Embodiment 1

Figure 2:
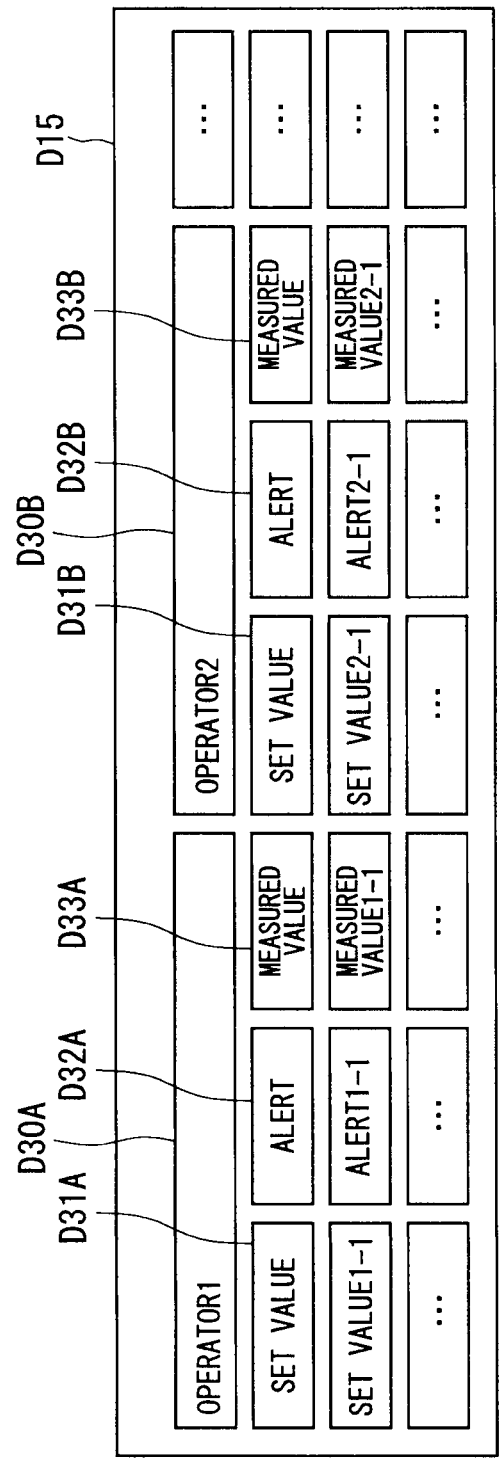
FIG. 2 is an explanatory diagram showing an exemplary content of focused information that is registered in a focused information database shown in FIG. 1.

FIG. 1 is a block diagram showing a configuration of a monitor control system according to an embodiment 1 of the present invention.

The monitor control system of the embodiment 1 includes an actual plant 11, an online data collecting part 12, an input/output instrument 13, a focused item setting part 14, a focused information database 15, a list screen preparation part 16, and a report determination part 17.

In the actual plant 11, measurement sensors (not shown) are installed at respective measurement points, and the online data collecting part 12 collects measured value information that indicates a measured value measured by each sensor. The online data collecting part 12 also collects set values of various control instruments for controlling the actual plant 11 as set value information indicating the set value, together with identification information of an operator having changed the set value. That is, collected information D11 collected from the actual plant 11 to the online data collecting part 12 includes the measured value information and the set value information mentioned above.

A touch panel device is assumed as the input/output instrument 13, and the input/output instrument 13 is shown as one instrument block having both an input function and an output function (including a display part with a graphical user interface function). The input/output instrument may perform an input and an output by different instruments, such as a combination of a display device (display part) having a graphical user interface function and a keyboard/mouse. Set values of the various control instruments for controlling the actual plant 11 can be set based on a set value input signal S13 supplied from the input/output instrument 13. The input signal S13 includes information identifying an operator having set the set value input.

Although FIG. 1 shows only one input/output instrument 13 for the sake of convenience, actually, the input/output instrument 13 is provided for each operator. In other words, when there are a predetermined number N (≥1) of operators, N input/output instruments 13 are provided.

In the plant monitor control system, any information item displayed on a monitor control screen of an output part (display part) of the input/output instrument 13 is assigned a unique identification number. There are the following three kinds of information.

(a) First, the information includes a measured value indicated by the measured value information that is included in the collected information D11 collected from the actual plant 11. The measured value includes a calculation result representing a simulated behavior of a plant simulator or the like.

(b) Second, the information includes an alert for determining a plant state based on a determination formula registered in the plant monitor control system and the measured value indicated by the measured value information. The alert includes not only an alert signal generating an alarm sound for notification but also a signal not generating an alarm sound, such as a signal displaying a plant state by means of lighting a lamp, for example.

(c) Third, the information includes a set value that is transmitted by the operator through the input/output instrument 13 to each control instrument for controlling the actual plant 11.

As described above, the measured value information and the set value information indicating the measured value and the set value, respectively, are included in the collected information D11. The online data collecting part 12 determines the necessity of the alert by making a determination using the foregoing determination formula based on the measured value indicated by the measured value information that is included in the collected information D11. Then, the online data collecting part 12 generates the alert information indicating a result of the determination.

As a result, actual plant information D12 outputted from the online data collecting part 12 to the report determination part 17 includes the measured value information, the set value information, and the alert information.

The focused item setting part 14 is a configuration section for setting, among the items displayed on the monitor control screen of the display part of the input/output instrument 13, an item (focused item) focused by each operator. An operation of selecting the focused item using the focused item setting part 14 is performed through the input/output instrument 13. The focused item selectively set by the focused item setting part 14 is, together with the identification number of the operator who has made this selection, registered as focused information D15 in the focused information database 15. Here, the focused item is an item corresponding to any of the measured value, the set value, and the alert indicated by the measured value information, the set value information, and the alert information, respectively, described above.

Hereinafter, any one of the measured value information, the set value information, and the alert information, may be simply referred to as "plant element information".

The report determination part 17 determines whether or not there is a change of the focused item indicated by the focused information D15 registered in the focused information database 15, based on the actual plant information D12 outputted from the online data collecting part 12.

The report determination part 17 is composed of three determination parts, namely, a set value determination part 17A, an alert determination part 17B, and a measured value determination part 17C.

The set value determination part 17A monitors, among the set values indicated by the set value information included in the actual plant information D12, a set value coincident with the focused item that exists in the focused information D15. In a case where the set value coincident with the focused item is changed by an operator different from the operator having registered this focused item, the set value determination part 17A generates a report determination information D17a indicating that a report is necessary for the changed set value.

The alert determination part 17B monitors, among the alerts indicated by the alert information included in the actual plant information D12, an alert coincident with the focused item that exists in the focused information D15. In a case where this alert newly occurs or the currently occurring alert stops, the alert determination part 17B generates report determination information D17b indicating that a report is necessary for the objective alert.

The measured value determination part 17C monitors, among the measured values indicated by the measured value information included in the actual plant information D12, the measured value coincident with the focused item that exists in the focused information D15, and recognizes a tendency of the change of this measured value (signal) based on a statistical process. In a case where a behavior of the measured value such as an average value and an increase/decrease amount is changed, the measured value determination part 17C generates a report determination information D17c indicating that a report is necessary for the objective measured value.

Each of the set value determination part 17A, the alert determination part 17B, and the measured value determination part 17C generates the report determination information D17a to D17c whose contents are independent for the respective operators, based on the identification information of each operator.

In this manner, the report determination part 17 including the set value determination part 17A, the alert determination part 17B, and the measured value determination part 17C outputs report determination information D17 including the report determination information D17a to D17c, based on the actual plant information D12 and the focused information D15.

The list screen preparation part 16 prepares list screen information D16 for a list screen that collectively displays, for each operator, the focused items included in the focused information D15 existing in the focused information database 15.

The display part (output part) of the input/output instrument 13 displays the monitor control screen and a report information display based on the report determination information D17, the list screen information D16, and the actual plant information D12 obtained through the report determination part 17.

FIG. 2 is an explanatory diagram showing an exemplary content of the focused information D15 that is registered in the focused information database 15. The focused information D15 has focused items corresponding to each of operator information D30A, D30B, and so on. The focused items are, based on the identification numbers thereof, classified into the set value information D31A, D31B, and so on, the alert information D32A, D32B, and so on, and the measured value information D33A, D33B, and so on.

Accordingly, the set value determination part 17A can recognize the set value indicated by the set value information D31A as the focused item of an operator indicated by the operator information D30A. The alert determination part 17B can recognize the alert indicated by the alert information D32B as the focused item of an operator indicated by the operator information D30B. The measured value determination part 17C can recognize the measured value indicated by the measured value information D33A as the focused item of an operator indicated by the operator information D30A.

Figure 3:
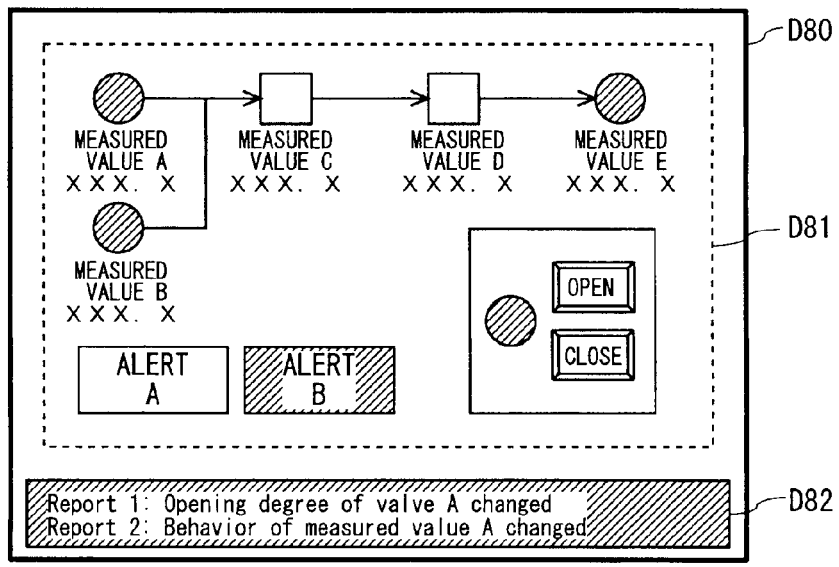
FIG. 3 is an explanatory diagram schematically showing an example of a display on a display part based on report determination information supplied from a report determination part shown in FIG. 1.

FIG. 3 is an explanatory diagram schematically showing an example of the display on the display part of the input/output instrument 13 based on the report determination information D17 supplied from the report determination part 17.

As shown in FIG. 3, on the display part of the input/output instrument 13, a monitor control screen D81 is displayed in a display presentation D80.

In a normal plant state, only the monitor control screen D81 is displayed in the display presentation D80 on the input/output instrument 13.

If the report determination part 17 determines that the plant state is changed, the display part of the input/output instrument 13 of only the corresponding operator displays a report information display D82 in addition to the monitor control screen D81 that is normally displayed.

In the example shown in FIG. 3, a telop display form is adopted as the display method. As the report information display method, other display methods are also adoptable such as displaying a pop-up window and lighting a reporting lamp.

The report "Report 1: Opening degree of valve A changed" indicated in an upper part of the report information display D82 is an example of the report based on the report determination information D17a generated by the set value determination part 17A as a result of another operator changing the set value. The report "Report 2: Behavior of measured value A changed" indicated in a lower part of the report information display D82 is an example of the report based on the report determination information D17c generated by the measured value determination part 17C.

Figure 4:
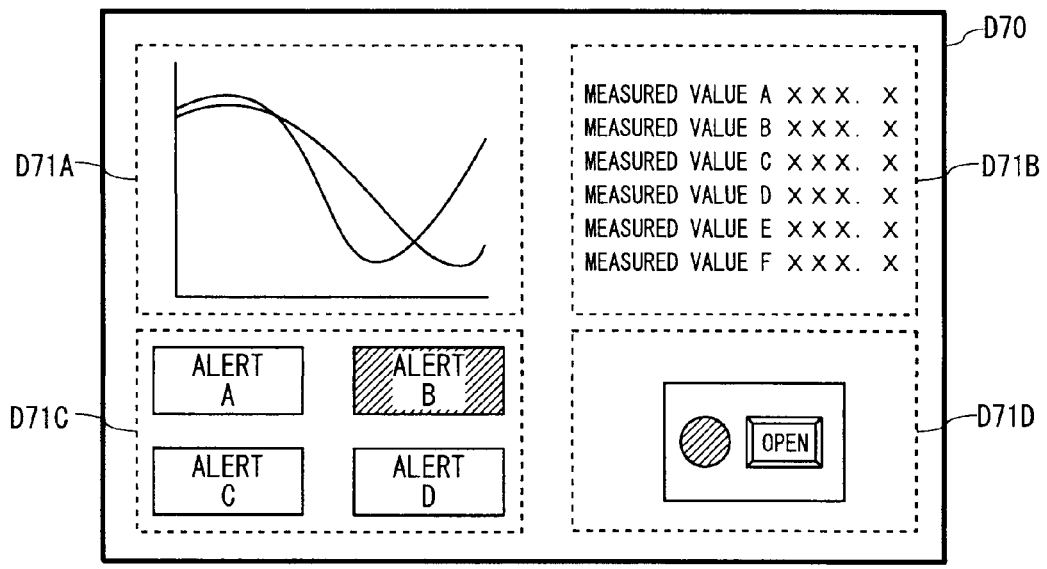
FIG. 4 is an explanatory diagram schematically showing an example of a display on a focused item list display screen.

FIG. 4 is an explanatory diagram schematically showing an example of the display on the focused item list display screen.

If the report information is displayed on the report information display D82 as shown in FIG. 3, each of the operators operates the list screen preparation part 16 through the input/output instrument 13 to make a display presentation D70 that displays a focused item list shown in FIG. 4. Thereby, the operator can check the behavior of the focused item. As shown in FIG. 4, the focused display items can be browsed at one time, and thus a situation can be determined quickly.

The display presentation D70 shown in FIG. 4 is prepared based on the list screen information D16 of the list screen preparation part 16. In the example shown herein, the focused information D15 registered in the focused information database 15 is displayed such that the information is collected according to the kinds thereof. Displaying according to the kinds exerts an effect that the visibility to the operator is improved so that the operator can accurately comprehend the plant state in the actual plant 11 for a shorter time period.

As for a method of displaying each information, a display method such as a trend graph display D71A or a tabular display D71B can be used for the measured value information. A display method such as a lamp type display D71C can be used for the alert information. A display method such as an icon display D71D or a tabular display can be used for the set value information.

In this manner, the monitor control system of the embodiment 1 includes: the focused information database 15 capable of, with respect to the actual plant information D12, storing the focused information D15 that is information associating a focused item focused by each operator with that operator; and the report determination part 17 for outputting, independently for each operator, the report determination information D17 indicating the measured value, the alert, and the set value that are coincident with the corresponding operator's focused items and that are determined to need to be reported, based on the actual plant information D12 and the focused information D15.

As a result, in the monitor control system of the embodiment 1, each of a predetermined number of operators registers his/her focused item as the focused information D15 on the focused information database 15. Thereby, each operator recognizes the report determination information D17 concerning his/her desired focused item on the monitor control screen. This exerts an effect that the operator can easily check a sign of a change of the focused item.

In this manner, if the operator registers the item to be focused as the focused information D15 on the focused information database 15, the monitor control system of the embodiment 1 can report a change of the focused item on the monitor control screen when such a change is observed. Accordingly, even when the operator browses another screen, the above-described report allows the operator to promptly find the change in the plant state of the actual plant 11.

In the monitor control system of the embodiment 1, since the report determination part 17 includes the set value determination part 17A, the alert determination part 17B, and the measured value determination part 17C, there is an effect that the report determination information about each of the set value, the alert, and the measured value that are focused can be easily recognized on the monitor control screen.

In this manner, in the monitor control system of the embodiment 1, a variation in the measured value occurring until the alert is generated, and a change of the set value made by another person can be reported on the monitor control screen. Therefore, for example, before the alert actually occurs, the operator can preliminarily find occurrence of an alert based on a change of the measured value and can promptly deal with it.

Embodiment 2

FIG. 5 is a block diagram showing a configuration of a monitor control system according to an embodiment 2 of the present invention. Configuration sections, information, and the like, that are identical to those of the monitor control system according to the embodiment 1 shown in FIG. 1 are denoted by the identical reference numerals, respectively, and descriptions thereof may be omitted as appropriate.

In a case where the operator performs a plant operation on the actual plant 11, sometimes a high-speed simulator is used to predict a plant behavior of the actual plant 11 and evaluate an input operation performed by the input/output instrument 13.

At this time, the operator attempting to perform the operation can easily check a result of the prediction for the item (plant element information) focused by himself/herself, but can hardly evaluate a behavior of the item focused by himself/herself based on comprehension of an influence of an item focused by another operator. Therefore, if one operator performs an input operation (operation on the set value) that is not intended by another operator, another operator may fail to recognize the change of the plant behavior.

In the monitor control system of the embodiment 2, an input data collecting part 18 collects the set value input signal S13 outputted from the input/output instrument 13, and outputs it to the high-speed simulator 19.

The measured value information, which is a part of the collected information D11 of the online data collecting part 12, is also inputted to the high-speed simulator 19. Although, for the sake of convenience, the input signals S13 supplied to the actual plant 11 and the input data collecting part 18 are denoted by the same reference numeral, it may be also possible that the input signals S13 having different contents are supplied to the actual plant 11 and the input data collecting part 18.

Accordingly, the high-speed simulator 19 predicts a change of the plant behavior of the actual plant 11 faster than an actual time period based on the supplied input information (the input signal S13 and the measured value information included in the collected information D11), and outputs prediction result information D19 indicating a result of the prediction to a report determination part 17S. The prediction result information D19 is an information content equivalent to the actual plant information D12. In other words, the prediction result information D19 includes the set value information, the alert information, and the measured value information. In this manner, the high-speed simulator 19 performs a simulation computation process using a computational model that represents a physical behavior of the actual plant 11, to predict the plant behavior faster than the actual time period, and can output the prediction result information D19 having a content equivalent to the actual plant information D12.

The report determination part 17S performs, on the prediction result information D19, the same determination operation as that performed on the actual plant information D12. Then, the report determination part 17S evaluates a behavior of the focused item in the focused information D15 that is registered in the focused information database 15 irrespective of whether the focused item is focused by a person performing the operation or a person not performing the operation. If it is determined that a report is necessary, the report determination part 17S outputs, to the input/output instrument 13, the report determination information D17 indicating the report concerning the prediction result.

Thus, the report determination part 17S receives the prediction result information D19 supplied from the input data collecting part 18 and the high-speed simulator, simultaneously with the actual plant information D12 supplied from the actual plant 11 and the online data collecting part 12. Then, the report determination part 17S determines the current plant state using the actual plant information D12 in the same manner as in the embodiment 1, and also can determine a future plant state using the prediction result information D19.

In this manner, the monitor control system of the embodiment 2 includes the report determination part 17S capable of further outputting the report determination information D17 concerning the prediction result based on the focused information D15 and the prediction result information D19 supplied from the high-speed simulator 19. This exerts not only the same effect as that of the embodiment 1, but also an effect that each operator can recognize, on the monitor control screen, the report determination information concerning his/her desired focused item before a change actually occurs in the actual plant 11.

Embodiment 3

Figure 6:
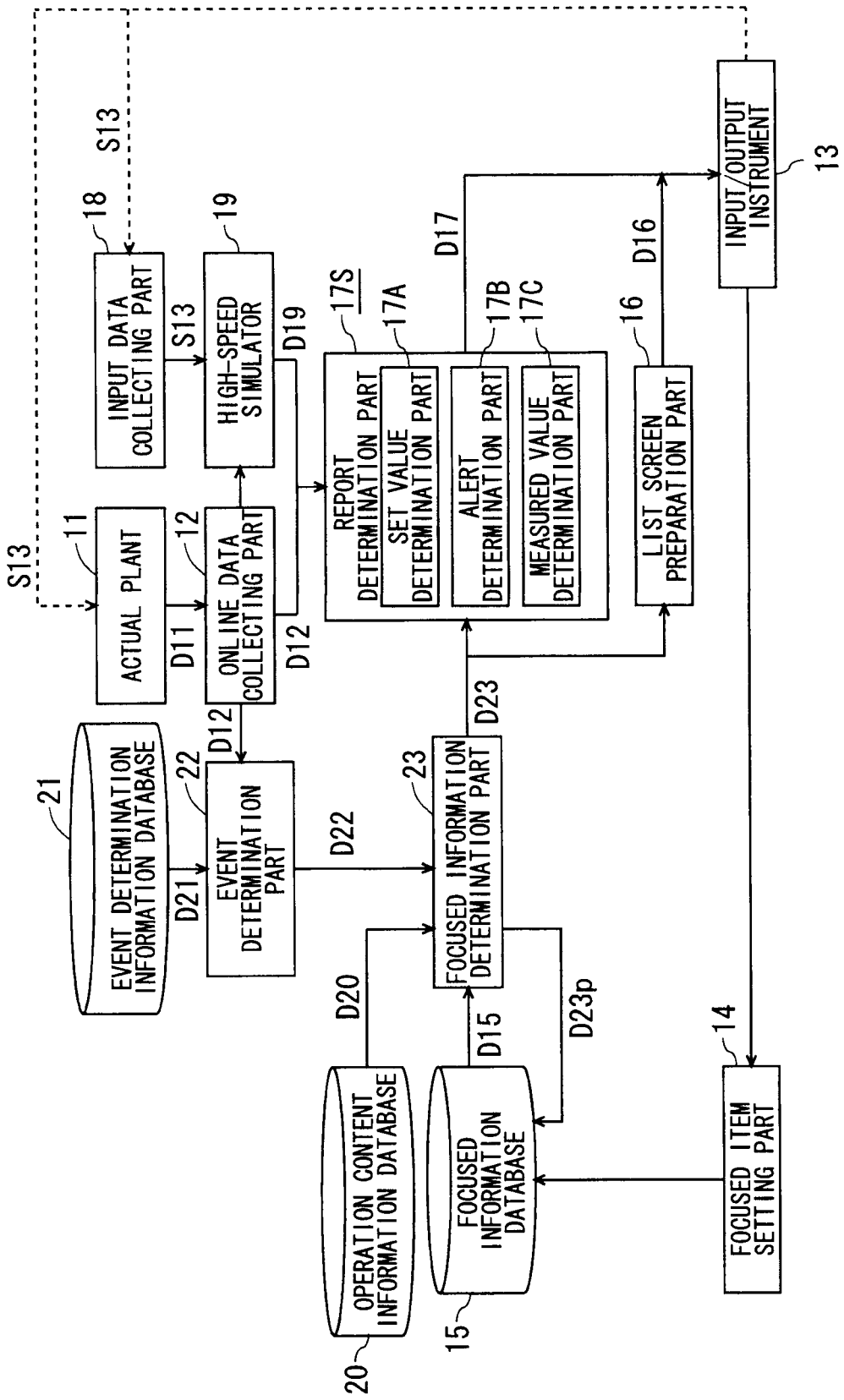
FIG. 6 is a block diagram showing a configuration of a monitor control system according to an embodiment 3 of the present invention.

FIG. 6 is a block diagram showing a configuration of a monitor control system according to an embodiment 3 of the present invention. Configuration sections, information, and the like, that are identical to those of the monitor control systems according to the embodiments 1 and 2 shown in FIGS. 1 and 5 are denoted by the identical reference numerals, respectively, and descriptions thereof may be omitted as appropriate.

Along with a change of the plant state of the actual plant 11, the operator's focused item also changes every moment. There is a case where a focused object frequently changes in a short period of time, such as in an operation for dealing with an accident. In an operation in which the focused item changes in a short period of time, if the operator manually updates the focused information D15 in the focused information database 15 to change the focused item, a large operation load is imposed on the operator.

In the monitor control system of the embodiment 3, an event determination part 22 is newly provided, which makes matching between the actual plant information D12 obtained from the online data collecting part 12 and event determination information D21 registered in an event determination information database 21, and estimates the current plant state and outputs estimated plant state information D22.

In an operation content information database 20 that is also newly provided, a display item (focused item) to be focused commonly by all the operators is registered as operation content information D20 in association with each plant state. Here, the "operation" means a series of operations performed on the actual plant 11 in accordance with an operation scenario prepared in advance in a case of an accident or the like.

A focused information determination part 23 is newly provided. Based on the focused information D15 supplied from the focused information database 15, the operation content information D20, and the estimated plant state information D22, the focused information determination part 23 compares the focused item (plant element information) included in the operation content information D20 with the focused item (plant element information) included in the focused information D15, by using an identification number representing the current estimated plant state that is indicated by the estimated plant state information D22.

If the focused information determination part 23 recognizes, among the focused items (determined focused items) stored in the operation content information D20, a focused item that does not exist in the focused information D15 as an unassigned determined focused item, the focused information determination part 23 performs a registration update process for registering and updating the focused information database 15 by giving, to the focused information database 15, additional focused information D23p indicating an addition of this unassigned determined focused item, so that latest focused information D23 is added to the focused information D15 stored in the focused information database 15, resulting in new focused information D15.

Moreover, the focused information determination part 23 outputs the latest focused information D23 including the focused information D15 and the additional focused information D23p to the report determination part 17S.

Based on the focused item (plant element information) indicated by the latest focused information D23, the report determination part 17S performs the same operation as the operation the report determination part 17 of the embodiment 2 performs on the focused information D15, to output the report determination information D17.

Likewise, based on the latest focused information D23, the list screen preparation part 16 performs the same operation as the list screen preparation part 16 of the embodiment 2, to output the list screen information D16.

In the monitor control system of the embodiment 3, even in a case where the operator fails to register a focused item in the focused information D15 in the focused information database 15, the focused information determination part 23 provided in the monitor control system automatically outputs the additional focused information D23p indicating the unassigned determined focused item to the focused information database 15. Thereby, a complementary process can be performed.

Also in a case where the focused item changes due to a change of the plant state of the actual plant 11, the above-mentioned complementary process is performed so that the monitor control system can automatically complement the changed focused item. This can reduce a load, on the operator, involved in editing the focused item using the focused item setting part 14.

Figure 7:
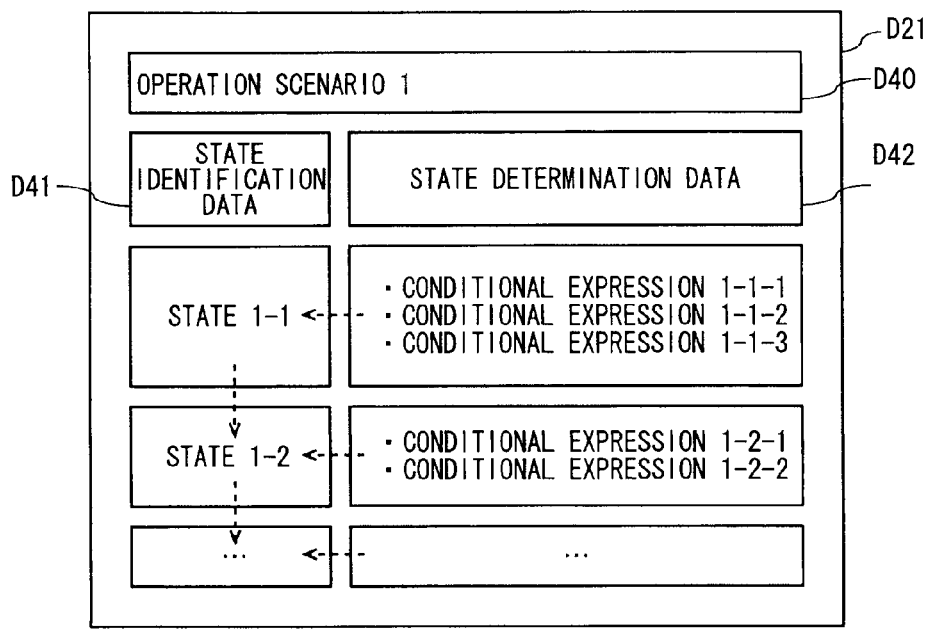
FIG. 7 is an explanatory diagram showing an exemplary content of event determination information that is registered in an event determination information database shown in FIG. 6.

FIG. 7 is an explanatory diagram showing an exemplary content of the event determination information D21 that is registered in the event determination information database 21.

As shown in FIG. 7, the event determination information D21 has state determination data D42 (state determination formula registration list) corresponding to each plant state identification number (operation scenario data D40+state identification data D41) of the actual plant 11.

Here, the plant state is registered while being classified into two stages, namely, the operation scenario data D40 that is event identification information and the state identification data D41 that is state identification information. However, the classification may be made into any number of stages.

The state determination data D42 registers a state-determination conditional expression for determining the plant state. The determination is made by using, as an input value, the plant element information (for example, the measured value indicated by the measured value information) included in the actual plant information D12 outputted from the online data collecting part 12. The conditional expression indicated by the actual plant information D12 may be any of the measured value, the alert, and the set value.

Based on a combination of results of the determinations by the conditional expressions, whether or not the current plant state is coincident with the registered plant state is determined. If the current plant state is coincident with the registered plant state, whether the current plant state has entered the registered plant state, is in the registered plant state, or has completed the registered plant state, is determined.

For example, in a case where the conditional expression indicated by the state determination data D42 relates to occurrence of an alert A, the determination that "the current plate state has entered the registered plant state" means that the alert A has occurred in the current determination though the alert A did not occur in the previous determination. The determination that "the current plate state is in the registered plant state" means that the alert A occurred in the previous determination and the occurrence still continues in the current determination. The determination that "the current plate state has completed the registered plant state" means that the alert A occurred in the previous determination and the state has recovered in the current determination.

In the example shown in FIG. 7, if "the conditional expression 1-1-1, the conditional expression 1-1-2, and the conditional expression 1-1-3" are satisfied, the plant state of the actual plant 11 can be estimated to be a state 1-1. Further, if "the conditional expression 1-2-1" and "the conditional expression 1-2-2" are satisfied in the "state 1-1", the plate state can be estimated to be a "state 1-2".

Figure 8:
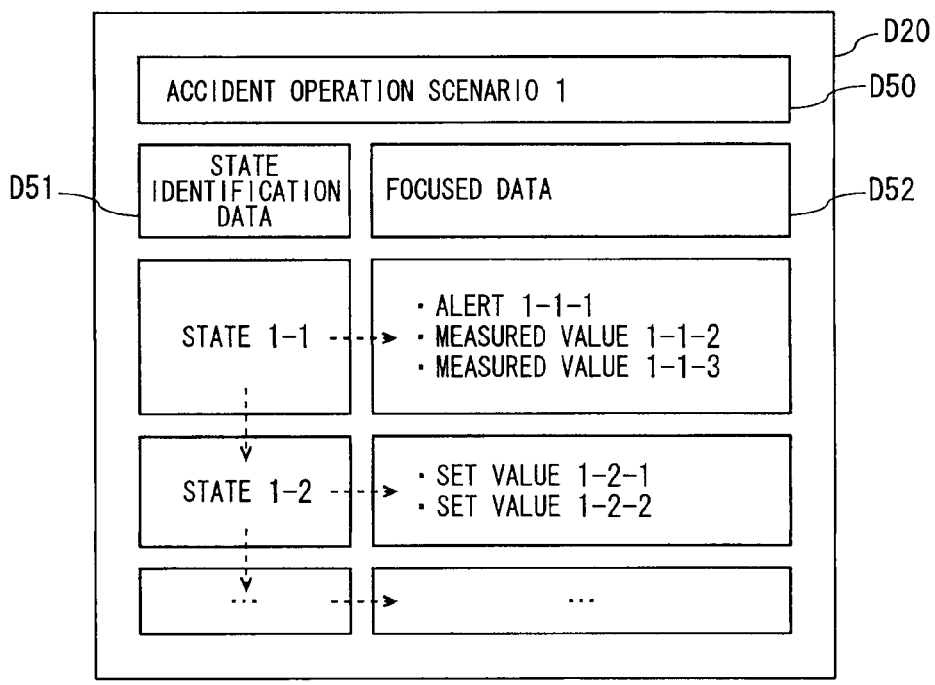
FIG. 8 is an explanatory diagram showing an exemplary content of an operation content information in an operation content information database shown in FIG. 6.

FIG. 8 is an explanatory diagram showing an exemplary content of the operation content information D20 stored in the operation content information database 20. The operation content information D20 has focused data D52 (focused information list) corresponding to each identification number (accident operation scenario data D50+state identification data D51) of the plant state. Here, a plurality of kinds of plant states are registered while being classified into two stages, namely, the accident operation scenario data D50 that is the event identification information and the state identification data D51 that is the state identification information. However, the classification may be made into any number of stages.

Identification numbers equivalent to the identification numbers of the operation scenario data D40 and the state identification data D41 stored in the event determination information D21 are used as identification numbers of the accident operation scenario data D50 and the state identification data D51.

The focused data D52 indicates an identification number of a display item to be focused in association with the plant state identification number of the state identification data D51. The identification number of the focused item registered in the focused data D52 is equivalent to the identification number of the focused information D15 registered in the focused information database 15.

In this manner, in the monitor control system of the embodiment 2, the focused information determination part 23 refers to the operation content information D20 based on the estimated plant state information D22, determines a focused item that is coincident with the plant state indicated by the estimated plant state information D22, and selects a determined focused item that is a focused item determined to be coincident with the plant state indicated by the estimated plant state information D22. Moreover, the focused information determination part 23 compares the determined focused item with the focused item included in the focused information D15, and if there is an unassigned determined focused item that is a focused item not included in the focused information D15, the focused information determination part 23 updates the focused information D15 such that the additional focused information D23p indicating this unassigned determined focused item can be registered in the focused information database 15, and furthermore the focused information determination part 23 outputs, to the report determination part 17S, new latest focused information D23 including the additional focused information D23p in addition to the focused information D15.

As a result, even in a case where the operator fails to register a focused item as the focused information D15, the focused information determination part 23 updates the focused information D15 stored in the focused information database 15 by using the additional focused information D23p indicating an item to be focused. Thereby, the monitor control system can determine the plant situation of the actual plant 11 and perform the complementary process for complementing the focused item.

In other words, along with a change of the plant state of the actual plant 11, the monitor control system automatically modifies the focused item. This consequently suppresses a load imposed on the operator in editing the focused information D15.

Embodiment 4

Figure 9:
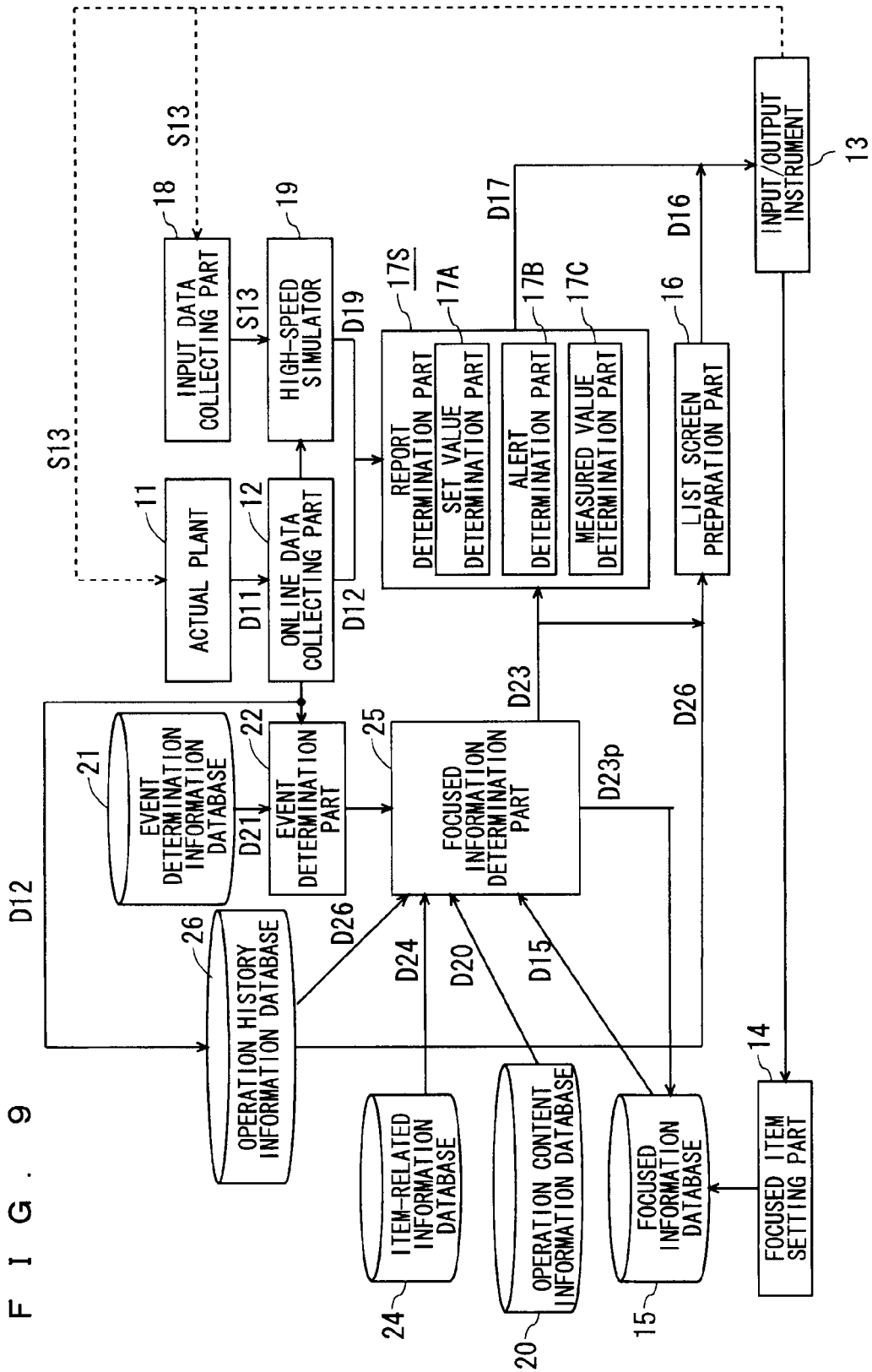
FIG. 9 is a block diagram showing a configuration of a monitor control system according to an embodiment 4 of the present invention.

FIG. 9 is a block diagram showing a configuration of a monitor control system according to an embodiment 4 of the present invention. Configuration sections, information, and the like, that are identical to those of the monitor control systems according to the embodiments 1 to 3 shown in FIGS. 1, 5 and 6 are denoted by the identical reference numerals, respectively, and descriptions thereof may be omitted as appropriate.

In the monitor control system according to the embodiment 4, operation history information D26 that is a history of the actual plant information D12 collected by the online data collecting part 12 is registered in operation history information database 26 that is newly provided.

A focused information determination part 25 has an extended function as compared with the function of the focused information determination part 23 according to the embodiment 3. That is, the focused information determination part 25 obtains the operation history information D26 indicating a history of the actual plant information D12 of each operator that is registered in the operation history information database 26, the focused information D15 of each operator that is registered in the focused information database 15, the estimated plant state information D22, and the operation content information D20.

The focused information determination part 25 further obtains item-related information D24 indicating relevance among display items that is registered in the item-related information database 24.

The focused information determination part 25 has a person allocation function of making an analysis based on the item-related information D24 and allocating the focused item stored in the operation content information D20 to any of the operators. This point will be described in detail below.

Based on the focused information D15, the focused information determination part 25 allocates to each operator the focused item (the focused data D52 in FIG. 8) included in the operation content information D20, and compares the determined focused item stored in the operation content information D20 with the focused item included in the focused information D15. If an unassigned determined focused item (a focused item indicated by the additional focused information D23p) that is a focused item not existing in the focused information D15 is found in the determined focused items existing in the operation content information D20, the focused information determination part 25 performs a person assignment process for selecting an operator as an assignee based on the item-related information D24.

Then, the focused information determination part 25 prepares, as the additional focused information D23p, information associating the operator selected by the person assignment process with the unassigned determined focused item, and outputs the additional focused information D23p to the focused information database 15, to perform the registration update process for registering and updating the focused information D15.

In a case where a plurality of operators share the operation, a display item to be focused by each operator varies depending on his/her operation content. In a case where a plurality of operators share the operation, if a failure to register any item to be focused is found, this monitor control system can allocate the focused item to an appropriate operator.

Figure 10:
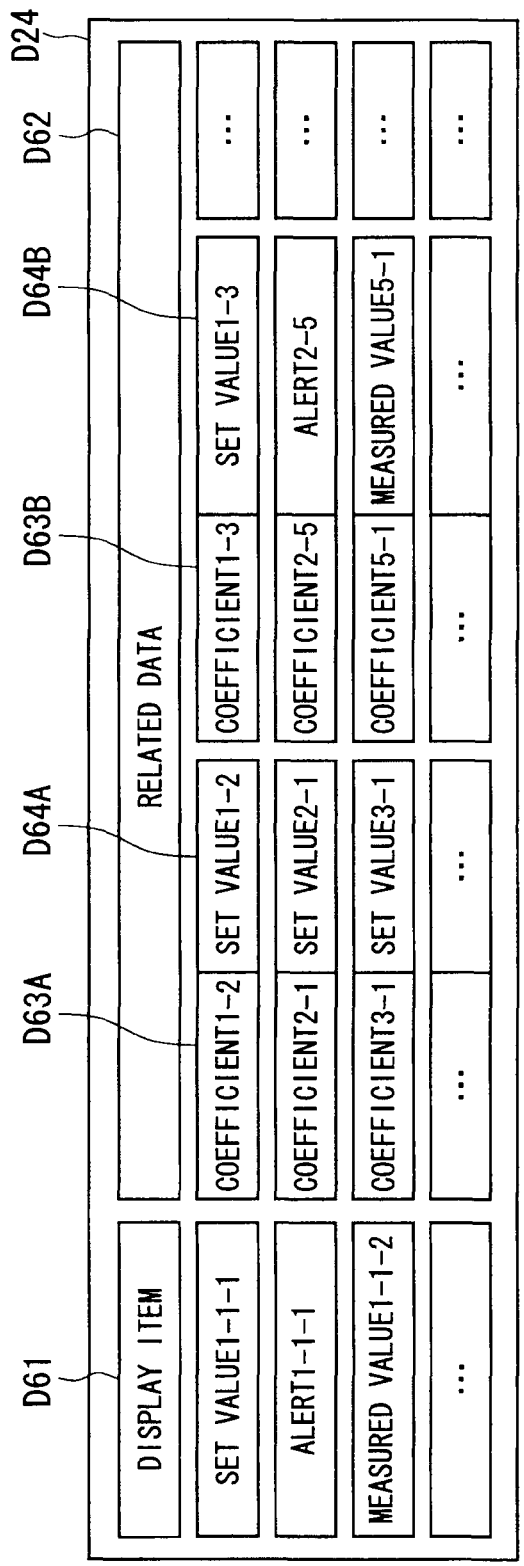
FIG. 10 is an explanatory diagram showing an exemplary content of item-related information in an item-related information database shown in FIG. 9.

FIG. 10 is an explanatory diagram showing an exemplary content of the item-related information D24 stored in the item-related information database 24. The item-related information D24 has display item information (relevance coefficient information D63 and related-item information D64) related to each display item identification information D61.

A combination of display items to be focused changes depending on the plant state. Related display item information (related data) D62 is made up of relevance coefficient information D63 (relevance coefficient information D63A, D63B, . . . ) and related-item information D64 (related-item information D64A, D64B, . . . ). The relevance coefficient information D63 indicates an item relevance coefficient having, as an input variable, the plant state identification number indicated by the estimated plant state information D22. The degree of relevance among the display items varies depending on the item relevance coefficient whose value varies depending on the plant state. The related-item information D64 indicates other item elements (the set value, the alert, and the measured value) related to the item elements (the set value, the alert, and the measured value) indicated by the display item identification information D61.

When the focused information determination part 25 allocates to each operator the unassigned determined focused item in the determined focused item (focused data D52) stored in the operation content information D20, the person assignment process is performed based on the item-related information D24 such that this unassigned determined focused item can be allocated to the operator having, in the focused information D15, the focused item whose item relevance coefficient value indicated by the related-item information D64 is greatest.

In the following, an example of an operation of the focused information determination part 25 will be described. Here, it is assumed that the event determination part 22 indicates the state 1-1 (see FIGS. 7 and 8) in the estimated plant state information D22.

The focused information determination part 25 uses the "state 1-1" indicated by the estimated plant state information D22 as a retrieval key to extract, as the determined focused items, the "alert 1-1-1", the "measured value 1-1-2", and the "measured value 1-1-3" in the focused data D52 that correspond to the "state 1-1" in the state identification data D51 of the operation content information D20.

Then, the focused information determination part 25 compares the focused items of all the operators indicated by the focused information D15 with the determined focused items, and recognizes, as the unassigned determined focused item, the determined focused item not coincident with any focused item.

Then, the focused information determination part 25 refers to the item-related information D24, to select an operator having, in the focused information D15, a focused item most strongly correlated with the unassigned determined focused item. The focused information determination part 25 assigns this unassigned determined focused item to the selected operator.

For example, in a case where the "measured value 1-1-2" is an unassigned determined focused item, the "measured value 3-1", the "measured value 5-1", and the like, indicated by the related-item information D64A and D64B are recognized as items related to the "measured value 1-1-2". Among the operators having items in the focused information D15, an operator who has the items of "coefficient 3-1", "coefficient 5-1", and the like, and who also has the item whose relevance coefficient value indicated by the relevance coefficient information D63 is greatest, is selected as a new assigned operator. The "measured value 1-1-2" is assigned as a new focused item to the selected new assigned operator.

Likewise, in a case where the "set value 1-1-1" is an unassigned determined focused item, the "set value 1-2", the "set value 1-3", and the like, indicated by the related-item information D64A and D64B are recognized as items related to the "set value 1-1-1". Among the operators having items in the focused information D15, an operator who has the items of "coefficient 1-2", "coefficient 1-3", and the like, and who also has the item whose relevance coefficient value indicated by the relevance coefficient information D63 is greatest, is selected as a new assigned operator. The "set value 1-1-1" is assigned as a new focused item to the selected new assigned operator.

Moreover, in a case where the "set value 1-1-1" is an unassigned determined focused item and there is no operator having the items of "set value 1-2", "set value 1-3", and the like, in the focused information D15, the focused information determination part 25 selects, among the operators having the items of "set value 1-2", "set value 1-3", and the like, in the operation history information D26, an operator who has the item whose relevance coefficient value indicated by the relevance coefficient information D63 is greatest as a new assigned operator, and assigns the "set value 1-1-1" to the new assigned operator.

Consequently, the focused information determination part 25 outputs the latest focused information D23 whose contents have been obtained as a result of the above-described allocation process to the report determination part 17S, and moreover updates the focused information D15 stored in the focused information database 15 so as to add the additional focused information D23$p$ indicating a content of the unassigned determined focused item allocated by the above-described allocation process and the new assigned operator.

In this manner, in the monitor control system of the embodiment 4, in a case where there is an unassigned determined focused item, the focused information determination part 25 determines, as a new assigned operator, an operator having the most strongly related item as a focused item in the focused information D15, based on the item-related information D24 and the focused information D15. Then, the focused information determination part 25 associates the new assigned operator with this unassigned determined focused item, and updates the focused information D15 in the focused information database 15 by registering the unassigned determined focused item as a focused item associated with the new assigned operator.

As a result, even in a case where all of the plurality of operators fail to register focused items as the focused information D15, the focused information determination part 25 updates the focused information D15 registered in the focused information database 15 by registering the focused item in association with the most appropriate operator by using the additional focused information D23$p$ indicating the item needing to be focused. Thereby, the monitor control system can determine a plant situation and appropriate perform the complementary process for complementing the focused item.

In other words, along with a change of the plant state of the actual plant 11, the monitor control system automatically performs a modification of the focused item including allocation of an operator. This consequently suppresses a load involved in a plurality of operator editing the focused information D15.

Furthermore, in the monitor control system of the embodiment 4, in a case where no new assigned operator can be determined based on the item-related information D24 and the focused information D15, the focused information determination part 25 determines, as a new assigned operator, an operator having the set value information of the most related item in the operation history information D26, based on the item-related information D24 and the operation history information D26. Then, the focused information determination part 25 associates this new assigned operator with the unassigned determined focused item, and updates the focused information D15 registered in the focused information database 15 by registering the focused item in association with the new assigned operator.

As a result, in a case where there is an unassigned determined focused item, the focused information D15 stored in the focused information database 15 can be updated while associating the unassigned determined focused item with the most appropriate operator at a relatively high rate.

Although the operation history information database 26 of the embodiment 4 accumulates the actual plant information D12 to provide the operation history information D26, the set value input signal S13 may be instead accumulated to provide the operation history information D26. In other words, the above-described effect in determining the new assigned operator using the operation history information D26 can also be achieved as long as at least the set value information (including information capable of identifying an operator having made an input) included in the actual plant information D12 can be accumulated as the operation history information D26.

Embodiment 5

FIG. 11 is a block diagram showing a configuration of a monitor control system according to an embodiment 5 of the present invention. Configuration sections, information, and the like, that are identical to those of the monitor control systems according to the embodiments 1 to 4 shown in FIGS. 1, 5, 6, and 9 are denoted by the identical reference numerals, respectively, and descriptions thereof may be omitted as appropriate.

In the monitor control system according to the embodiment 5, a list screen preparation part 16X has an extended function as compared with the function of the list screen preparation part 16. That is, the list screen preparation part 16X has a function of extracting an operation history based on the report determination information D17, the item-related information D24, and the operation history information D26.

More specifically, in the monitor control system of the embodiment 5, if the operator receives a report concerning a change of the plant measured value in the actual plant 11 from the report determination information D17 of the report determination part 17, the operator can retroactively check a behavior of the plant measured value and the like by means of the focused item list display screen that is prepared by the list screen preparation part 16X performing an operation history extraction operation which will be described later.

In a case where a plurality of operators share the operation to perform a monitor control operation in the actual plant 11, it is difficult for them to accurately comprehend each other's operation contents. Therefore, if a change of the plant measured value or the like indicated by the measured value information of the actual plant information D12 is caused not by a change of the plant state itself, such as a progress of an accident event, but by an operation performed by another operator, much time may be required for identifying the cause of the change.

In the monitor control system of the embodiment 5, the list screen preparation part 16X performs an operation history extraction operation based on the report determination information D17, the item-related information D24, and the operation history information D26. More specifically, when the report determination part 17 issues a report in the report determination information D17, the list screen preparation part 16X extracts, from the operation history information D26 of all the operators registered in the history information database 26, an operation history related to a focused item having been determined to need to be reported, based on the identification number of the focused item having been determined to need to be reported and the item-related information D24 registered in the item-related information database 24.

The list screen preparation part 16X prepares the list screen information D16 indicating the focused item list display screen including selected history information that is operation history information extracted by the operation history extraction operation described above, and then supplies history extraction information to the operator through the input/output instrument 13.

The operator refers to the display part of the input/output instrument 13, to browse the operation history related to the change of the plant measured value. This exerts an effect that the operator can easily guess a cause of the change of the measured value.

In the following, an example of an operation of the list screen preparation part 16X will be described. Here, it is assumed that the report determination information D17 supplied from the report determination part 17 indicates the alert A.

In this case, the list screen preparation part 16X recognizes the alert A based on the report determination information D17, and searches for the related-item information D64 of the item-related information D24 by using the alert A as a retrieval key, to select a strongly related item (supposedly, "valve A").

Then, the list screen preparation part 16X searches for the operation history information D26 by using the valve A as a retrieval key, and recognizes an operator B who has previously operated (for example, closed) the valve A.

Consequently, the list screen preparation part 16X incorporate information indicating "operator B closed valve A" into the list screen information D16 on the list screen. This allows a person other than the operator B to refer to the screen displayed on the display part of the input/output instrument 13 and recognize why the alert A has occurred.

In this manner, in the monitor control system of the embodiment 5, the list screen preparation part 16X enables even the selected history information, which is obtained by selecting the operation history information D26 related to the focused information D15 from the operation history information D26 based on the item-related information D24, to be displayed on the monitor control screen of the display part of the input/output instrument 13.

As a result, the operator refers to the display part of the input/output instrument 13 and browses the selected operation history mentioned above, and thereby can easily guess a cause of a change of the measured value, the alert, or the like, in a retroactive manner. This exerts an effect that the operator can easily understand the situation.

In general, a combination of the focused items changes depending on the plant situation of the actual plant 11. In the monitor control system of the embodiment 5, the item-related information D24 has a coefficient that determines the degree of relevance in accordance with the plant situation of the actual plant 11. Therefore, appropriate information can be picked up in accordance with the plant situation.

Embodiment 6

FIG. 12 is a block diagram showing a configuration of a monitor control system according to an embodiment 6 of the present invention. Configuration sections, information, and the like, that are identical to those of the monitor control systems according to the embodiments 1 to 4 shown in FIGS. 1, 5, 6, and 9 are denoted by the identical reference numerals, respectively, and descriptions thereof may be omitted as appropriate.

In the monitor control system according to the embodiment 6, the focused item setting part 14 can register a display item focused by each operator with a history thereof in a focused information database 15X.

In the focused information database 15X, not only the focused information D15 that is a list of focused items currently focused by the operators, but also previous focused information D15x that is a list of focused items previously focused by the operators, are registered. The list of previously focused items indicated by the previous focused information D15x includes, in addition to the display item information, either or both of information concerning a focused time period and information concerning the plant state at the time of being focused.

When selecting a focused item in the focused information D15, the operator can use the time period information or the plant state information as a key to search for the list of previously focused items in the previous focused information D15x that is registered in the focused information database 15X. Based on a search result obtained, the operator can edit the list of focused items in the focused information D15, and thus reduce an operation load involved in registering the focused item.

In this manner, in the monitor control system of the embodiment 6, not only the display item currently focused by the operator but also the list of previously focused items obtained in a search result from the previous focused information D15x, can be re-adopted as the focused information D15. Thereby, the report determination can be made, and the focused item list display screen can be prepared. As a result, even if it was previously determined that a display item is not a focused object, the value of the display item can be checked afterward. This exerts an effect that, without the need for newly re-registering a focused item by the focused item setting part 14, the previously focused item obtained from the previous focused information D15x can be edited and reused as the current focused information D15.

In the monitor control system of the embodiment 6, in the focused information database 15X, not only the current focused information D15 but also the previously registered focused information are registered as the previous focused information D15x in association with either or both of the information concerning the time period in which the registration was made and the identification information representing the plant state in the time period in which the registration was made.

Therefore, when selecting a focused display item in the focused information D15, the operator can edit the previous focused information D15x registered in the focused information database 15X by using the input/output instrument 13 and the focused item setting part 14. This exerts an effect that the operator can relatively easily reuse the previous focused information D15x as the current focused information D15.

For example, the operator searches for the previous focused information D15x, and thereby can recognize which display item was focused in a similar situation that previously occurred.

In this manner, the operator can use, together with the focused information D15 indicating the current focused item, the previous focused information D15x indicating the previously registered focused item. In general, the focused item changes in accordance with a change of the plant state of the actual plant 11. If it is desired to retroactively check, for example, the value of the focused item again, the previous focused information D15x can be used to thereby save trouble to re-register the focused item.

Embodiment 7

In the monitor control system of the embodiment 2 shown in FIG. 5, at a timing when the operator performs an operation input, the high-speed simulator 19 starts computation to predict a plant behavior. Then, based on the prediction result information D19 that is a result of the prediction of the behavior of each parameter, the report determination part 17S performs a report determination. Thereby, the report can be made at a timing faster than an actual plant time period.

In general, in a case where a plant to be simulated by the high-speed simulator 19 is a large scale plant, there is a tendency that a plant model is complicated and the amount of calculation increases. In a case of a large-scale plant, merely a fraction of the time-shortening effect exerted by the high-speed simulator 19 can be obtained. Thus, about a few minutes may be still required from the start to the completion of the simulation computation process. Therefore, in an embodiment 7 described below, an operation history search function is added to the high-speed simulator 19.

FIG. 13 is a block diagram showing a configuration of a monitor control system according to the embodiment 7 of the present invention. Configuration sections, information, and the like, that are identical to those of the monitor control systems according to the embodiments 1 to 4 shown in FIGS. 1, 5, 6, and 9 are denoted by the identical reference numerals, respectively, and descriptions thereof may be omitted as appropriate.

The monitor control system of this embodiment is characterized by including an operation history information database 27 and a high-speed simulator 29 instead of the operation history information database 26 and the high-speed simulator 19 of the embodiment 4 shown in FIG. 9.

The operation history information database 27 accumulates, in addition to the actual plant information D12, a simulation computation result that corresponds to, among prediction result information D29 supplied from the high-speed simulator 29, the prediction result information D19 supplied from the high-speed simulator 19 of the embodiment 2 for example. Accordingly, the operation history information database 27 stores operation history information D27 indicating a history of the actual plant information D12 and a history of the prediction result information D19.

On the other hand, similarly to the high-speed simulator 19 of the embodiment 2 for example, the high-speed simulator 29 serving as a high-speed prediction part performs the simulation computation process based on the set value information included in the input signal S13 and the measured value information that is a part of the collected information D11. Thus, information (simulation computation result) corresponding to the prediction result information D19 can be obtained.

Moreover, the high-speed simulator 29 can obtain search history information by using the operation history search function. In a case where the search history information can be obtained, the search history information is outputted as the prediction result information D29 without performing the above-described simulation computation process. Hereinafter, the operation history search function of the high-speed simulator 29 will be described in detail.

The high-speed simulator 29 accesses the operation history information database 27 to obtain the operation history information D27. Thereby, history information that is an accumulation of the previous actual plant information D12 and the prediction result information D19 is allowed to be searched for.

That is, at a timing when the set value input signal S13 outputted from the input/output instrument 13 is collected by the input data collecting part 18, the high-speed simulator 29 searches for the operation history information D27 by using, as a retrieval key, state information made up of a combination of the set value information that is indicated by the collected input signal S13 and the measured value information that is a part of the collected information D11. Thereby, the high-speed simulator 29 recognizes whether or not there is identical state information that is coincident with the retrieval key.

Then, if the high-speed simulator 29 recognizes identical state information that is coincident with the retrieval key from the operation history information D27, the high-speed simulator 29 extracts the search history information that is a series of history information starting from the identical state information from the operation history information D27 stored in the operation history information database 27, without performing the above-described simulation computation process. Then, the high-speed simulator 29 transmits this search history information, as the prediction result information D29, to the report determination part 17S. Examples of the series of history information include history information of the actual plant information D12 (prediction result information D19) within a predetermined time period from a time point where the identical state information appears, or history information of the actual plant information D12 (prediction result information D19) stored in, among a plurality of files classified according to each state information content that can serve as a starting point in the operation history information D27, a file matching the above-mentioned identical state information.

In a case where the prediction result information D29 is the above-mentioned search history information, the report determination part 17S performs the same determination operation as that performed on the actual plant information D12 or the prediction result information D19 by the high-speed simulator 19. If it is determined that a report is necessary, the report determination part 17S outputs, to the input/output instrument 13, the report determination information D17 concerning the prediction result indicating that a report is necessary.

If the high-speed simulator 29 cannot extract identical state information that is coincident with the retrieval key from the operation history information D27, the high-speed simulator 29 obtains, as the prediction result information D29, a simulation computation result corresponding to the prediction result information D19 which can be obtained by the above-described simulation computation process, similarly to the high-speed simulator 19 of the embodiment 2 for example.

In this manner, in the monitor control system of the embodiment 7, before the simulator 19 performs the simulation computation process, the high-speed simulator 29 searches the history information accumulated in the operation history information database 27 for identical state information that is coincident with the retrieval key, and reuses the series of history information starting from the identical state information, to thereby obtain the prediction result information D29. Thus, a time required for the simulation computation process can be shortened. This exerts an effect that the report determination information D17 can be outputted in a shorter time period.

If there are a plurality of identical state information coincident with the retrieval key in the operation history information D27, it is conceivable to, for example, select information preferentially in the order of (1) previous history information in the actual plant information D12 and then (2) less previous history information.

As described above, the high-speed simulator 29 serving as the high-speed prediction part of the monitor control system of the embodiment 7 uses, as a retrieval key, the state information made up of a combination of the set value information that is indicated by the input signal S13 and the measured value information that is a part of the actual plant information D12, and searches the operation history information D27 for identical state information coincident with the retrieval key. If the above-mentioned identical state information exists, the high-speed simulator 29 extracts the search history information that is a series of history information starting from the above-mentioned identical state information from the operation history information D27. Then, the high-speed simulator 29 outputs this search history information as the prediction result information D29, without performing the simulation computation process.

As a result, the monitor control system of the embodiment 7 exerts an effect that each operator can recognize, on the monitor control screen, the report determination information D17 concerning his/her desired focused item at a still higher speed than in the embodiment 2.

<Application to Computer>

The monitor control systems described in the embodiments 1 to 7 are configured with, for example, a main storage device, an arithmetic unit, an input device, a secondary storage device, an output device, and the like, and can be implemented by a computer apparatus having these devices commonly connected via a common bus.

In this type of computer apparatus, the online data collecting part 12, the focused item setting part 14, the list screen preparation part 16, the report determination part 17, the input data collecting part 18, the high-speed simulators 19 and 29, the event determination part 22, and the focused information determination parts 23 and 25 can be implemented by, for example, the arithmetic unit being operated based on a program for functioning a computer. Such a program can be stored in the main storage device or the secondary storage device.

The focused information database 15, the operation content information database 20, the event determination information database 21, the item-related information database 24, and the operation history information databases 26 and 27 can be implemented by the main storage device or the secondary storage device.

As described above, if most of the configuration sections of the present invention is implemented by a software process based on the program for functioning a computer, downsizing and weight reduction of the entire system are achieved, and additionally energy saving is also achieved.

In the present invention, the embodiments can be freely combined, and each of the embodiments can be appropriately modified or omitted, within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A monitor control system configured to perform a monitor control on an actual plant with reference to a monitor control screen, said monitor control system comprising:
    a plant information collecting part for collecting a measured value obtained from said actual plant and a set value for controlling said actual plant, and outputting actual plant information including measured value information, alert information, and set value information, said measured value information indicating said measured value, said alert information indicating the necessity of an alert based on said measured value, said set value information indicating said set value;
    a focused information database for storing focused information that is information associating focused items focused by a predetermined number of operators with said predetermined number of operators with respect to said actual plant information; and
    a report determination part for outputting report determination information independently for each of said predetermined number of operators based on said actual plant information and said focused information, said report determination information indicating at least one of the measured value, the alert, and the set value that is coincident with the focused item focused by a certain operator and additionally that is determined to need to be reported,
    wherein
    said report determination information includes reporting measured value information, reporting alert information, and reporting set value information that indicate the measured value, the alert, and the set value determined to need to be reported, respectively,
    said report determination part includes:
        a set value determination part for determining whether or not the set value focused by a certain person has been changed by a person other than said certain person, and then outputting information associating said focused set value with a result of said determination as said reporting set value information, said determination being made with respect to, among said set values indicated by said set value information included in said actual plant information, said set value existing as said focused item in said focused information;
        an alert determination part for outputting information associating said alert with the necessity of an alert as said reporting alert information, said association being made with respect to, among said alerts indicated by said alert information included in said actual plant information, said alert existing as said focused item in said focused information; and a measured value determination part for determining whether or not there is a tendency to cause a predetermined change and outputting information associating said measured value with a result of said determination as said reporting measured value information, said determination being made with respect to, among said measured values indicated by said measured value information included in said actual plant information, said measured value existing as said focused item in said focused information, said monitor control system further comprises a predetermined number of monitor control screens each provided for each of said predetermined number of operators and each making an output on said monitor control screen of each operator based on said report determination information.

2. The monitor control system according to claim 1, further comprising:

an event determination information database for storing event determination information including a state determination conditional expression that is a combination of identification information indicating a plant state of said actual plant, said measured value, said alert, and said measured value;

an event determination part for, based on said actual plant information, referring to said event determination information to estimate a current plant state of said actual plant, and outputting estimated plant state information;

an operation content information database for storing, in association of each of a plurality of kinds of plant states, operation content information indicating a focused item to be monitored from said actual plant information; and a focused information determination part for: based on said estimated plant state information, referring to said operation content information to determine a focused item coincident with the plant state indicated by said estimated plant state information; selecting a determined focused item that is said coincident focused item thus determined; comparing said determined focused item with said focused information registered in said focused information database; and if there is an unassigned determined focused item that is a focused item not included in said focused information, setting said unassigned determined focused item to be a new focused item and updating said focused information registered in said focused information database, and outputting said new focused information to said report determination part.

3. The monitor control system according to claim 1, further comprising an item-related information database registering therein item-related information that includes information in which another related item element is connected with a predetermined item relevance coefficient that uses a process state as an input parameter thereof, said another related item element being related to an item element that is any of said measured value, said alert, and said set value included in said actual plant information, wherein if there is said unassigned determined focused item, said focused information determination part determines a new assigned operator to be an operator who has a most strongly related focused item in said focused information based on said item-related information and said focused information, then associates said unassigned determined focused item with said new assigned operator, and updates said focused information registered in said focused information database by using said focused item associated with said new assigned operator.

4. The monitor control system according to claim 3, further comprising an operation history information database in which information including at least said set value information is accumulated as operation history information, said set value information in said operation history information including information allowing identification of an operator having inputted said set value, wherein if said new assigned operator cannot be determined based on said item-related information and said focused information, said focused information determination part determines a new assigned operator to be an operator who has the most strongly related set value information in said operation history information based on said item-related information and said operation history information, then associates said unassigned determined focused item with said new assigned operator, and updates said focused information database by registering said focused information associated with said new assigned operator.

5. The monitor control system according to claim 4, further comprising a screen preparation part allowing selected history information to be also displayed on said monitor control screen, said selected history information being obtained by being selected from said operation history information based on said item-related information, said selected history information being related to said focused information.

6. The monitor control system according to claim 1, wherein said focused information database is configured to register therein previously registered focused information in association with either or both of information concerning a time period in which the registration was made and identification information representing a plant state in a time period in which the registration was made, said monitor control system further comprises a focused item setting part having a function of searching for corresponding previous focused information from said previous focused information registered in said focused information database based on said information concerning said time period or said identification information representing said plant state, said focused item setting part being configured to add said previous focused information obtained by said searching to focused information currently focused by an operator.

7. The monitor control system according to claim 1, further comprising:

an input data collecting part for collecting said set value input signal; and a plant simulator for performing a simulation computation process using a computational model that represents a physical behavior of said actual plant based on at least a part of said input signal and said actual plant information, to predict a plant behavior in a time period shorter than an actual time period, and then outputting prediction result information having a content equivalent to a content of said actual plant information, wherein said report determination part further outputs report determination information concerning a prediction result independently for each of said predetermined number of operators based on said prediction result information and said focused information, said report determination information concerning a prediction result indicating at least one of the measured value, the alert, and the set value that is coincident with the focused item focused by a certain operator and additionally that is determined to need to be reported for each of said predetermined number of operators.

8. The monitor control system according to claim 4, further comprising:
   an input data collecting part for collecting said set value input signal; and
   a high-speed prediction part for performing a simulation computation process using a computational model that represents a physical behavior of said actual plant based on at least a part of said input signal and said actual plant information, to predict a plant behavior in a time period shorter than an actual time period, and then outputting, as prediction result information, a simulation computation result having a content equivalent to a content of said actual plant information, wherein
   said operation history information stored in said operation history information database further includes history information of the whole of said actual plant information and said simulation computation result,
   said high-speed prediction part uses state information including a combination of at least one of said set value information indicated by said input signal and said actual plant information as a retrieval key to search said operation history information for identical state information that is coincident with said retrieval key and, without performing said simulation computation process, extracts, from said operation history information, search history information that is a series of history information starting from said identical state information, and then outputs said search history information as said prediction result information,
   said report determination part further outputs report determination information concerning a prediction result independently for each of said predetermined number of operators based on said prediction result information and said focused information, said report determination information concerning a prediction result indicating at least one of the measured value, the alert, and the set value that is coincident with the focused item focused by a certain operator and additionally that is determined to need to be reported for each of said predetermined number of operators.

* * * * *